United States Patent [19]

Baur et al.

[11] Patent Number: 4,965,009

[45] Date of Patent: Oct. 23, 1990

[54] AQUEOUS ACIDIC CLEANER FORMULATIONS

[75] Inventors: Richard Baur, Mutterstadt; Dieter Stoeckigt, Ludwigshafen; Hans-Werner Neumann, Reilingen; Hans-Helmut Goertz, Freinsheim; Norbert Wagner, Mutterstadt, all of Fed. Rep. of Germany

[73] Assignee: BASF Aktiengesellschaft, Ludwigshafen, Fed. Rep. of Germany

[21] Appl. No.: 343,664

[22] Filed: Apr. 27, 1989

[30] Foreign Application Priority Data

May 5, 1988 [DE] Fed. Rep. of Germany ....... 3815291

[51] Int. Cl.[5] .......................... C11D 7/08; C23G 1/02; C09K 13/04; B08B 3/00

[52] U.S. Cl. .................................... 252/142; 252/136; 252/174.21; 252/79.4; 252/79.2; 252/DIG. 14; 134/3; 134/28

[58] Field of Search ...................... 252/136, 142, 79.2, 252/79.4, 174.21, DIG. 14

[56] References Cited

U.S. PATENT DOCUMENTS

| | | | |
|---|---|---|---|
| 4,501,680 | 2/1985 | Aszman et al. | 252/142 |
| 4,587,030 | 5/1986 | Casey | 252/92 |
| 4,649,224 | 5/1987 | Panek et al. . | |
| 4,665,239 | 5/1987 | Panek et al. . | |
| 4,709,099 | 11/1987 | Panek et al. . | |
| 4,714,565 | 12/1987 | Wevers et al. | 252/174.19 |
| 4,759,867 | 7/1988 | Choy et al. | 252/143 |

FOREIGN PATENT DOCUMENTS

| | | | |
|---|---|---|---|
| 235774 | 9/1987 | European Pat. Off. . | |
| 2224992 | 12/1973 | Fed. Rep. of Germany . | |
| 1500525 | 12/1968 | France . | |
| 2407979 | 6/1979 | France . | |
| 2004798 | 1/1987 | Japan | 252/174.21 |

*Primary Examiner*—Paul Lieberman
*Assistant Examiner*—James M. Silbermann
*Attorney, Agent, or Firm*—Oblon, Spivak, McClelland, Maier and Neustadt

[57] ABSTRACT

Aqueous acidic cleaner formulations contain, as essential components, (a) from 1 to 20% by weight of one or more nonionic surfactants based on oxyalkylated fatty alcohols, fatty acids, fatty amines, fatty amides or alkane-sulfonamides, (b) from 0.1 to 15% by weight of one or more polyetherpolyols which are obtainable by reacting a dihydric to hexahydric alcohol of 2 to 10 carbon atoms with an alkylene oxide of 2 to 4 carbon atoms and reacting this product with a 1,2-alkylene oxide or alkyl or alkenyl glycidyl ether of 8 to 30 carbon atoms and (c) from 1 to 40% by weight of one or more acids.

11 Claims, No Drawings

AQUEOUS ACIDIC CLEANER FORMULATIONS

Aqueous acidic cleaner formulations are known. They contain surfactants and acids as essential components. The known acidic industrial cleaners are used, for example, in dairies to remove deposits of lactic acid. They are also used for cleaning pipelines in which, in particular, deposits of calcium carbonate and magnesium carbonate have formed. To prolong the activity of these industrial cleaner systems in the cleaning of hard surfaces and hence to ensure optimum cleaning, the cleaner formulations must have a minimum viscosity to prevent the formulation from running too rapidly off the surface to be cleaned. The viscosity of the known cleaner formulations is obtained by using mixtures of various alkylphenol oxyethylates having different degrees of oxyethylation. Because it has become necessary for ecological reasons to replace the alkylphenol oxyethylates, in particular nonionic surfactants based on oxyalkylated fatty alcohols, fatty acids, fatty amines, fatty amides or alkanesulfonamides are now used. However, the viscosity of such aqueous acidic cleaner formulations is still unsatisfactory.

It is an object of the present invention to provide aqueous acidic cleaner formulations which have a higher viscosity than the known acidic industrial cleaners. The cleaner formulations should also have a long shelf life.

We have found that this object is achieved, according to the invention, by aqueous acidic cleaner formulations which contain.

(a) from 1 to 20% by weight of one or more nonionic surfactants based on oxyalkylated fatty alcohols, fatty acids, fatty amines, fatty amides or alkanesulfonamides, (b) from 0.1 to 15% by weight of one or more polyetherpolyols which are obtainable by reacting a dihydric to hexahydric alcohol of 2 to 10 carbon atoms with an alkylene oxide of 2 to 4 carbon atoms and reacting this product with a 1,2-alkylene oxide or alkyl or alkenyl glycidyl ether of 8 to 30 carbon atoms and (c) from 1 to 40% by weight of one or more acids, the percentages in each case being based on the weight of the total formulation.

The cleaner formulations may contain further conventional components, such as solubilizers, corrosion inhibitors and builders.

The aqueous acidic cleaner formulations contain, as an essential component (a), one or more nonionic surfactants based on oxyalkylated fatty alcohols, fatty acids, fatty amines, fatty, amides or alkanesulfonamides. These compounds are adducts of from 3 to 40 moles of ethylene oxide with 1 mole of a fatty alcohol, fatty acid, fatty amine, fatty amide or alkanesulfonamide, each of not less than 8 carbon atoms. The adducts of from 3 to 20 moles of ethylene oxide with 1 mole of one or more alcohols of 10 to 18 carbon atoms are particularly preferably used for the preparation of the aqueous acidic cleaner formulations. Preferred alcohols are coconut or tallow fatty alcohols, oleyl alcohol or synthetic alcohols of 8 to 18 carbon atoms. The synthetic alcohols are prepared, for example, by the oxo process or Ziegler process. Examples of preferably used alcohols are isodecanol, decanol, isotridecanol and mixtures of $C_{13}/C_{15}$-fatty alcohol mixtures and $C_{16}/C_{18}$-fatty alcohol mixtures. The particularly preferably used oxyethylated fatty alcohols are adducts with from 3 to 16 moles of ethylene oxide per mole of alcohol. The amount of nonionic surfactants in the aqueous acidic cleaner formulations is from 1 to 20, preferably from 5 to 15, % by weight.

The aqueous acidic cleaner formulations contain, as further essential components, one or more polyetherpolyols which are obtainable by reacting a dihydric to hexahydric alcohol of 2 to 10 carbon atoms with an alkylene oxide of 2 to 4 carbon atoms and reacting this product with a 1,2-alkylene oxide or alkyl or alkenyl glycidyl ether of 8 to 30 carbon atoms. Compounds of this type are described in, for example, U.S. Pat. Nos. 4,649,224, 4,655,239 and 4,709,099. The polyetherpolyols of components (b) are prepared in a process involving two or more stages. In the first process stage, an addition reaction with ethylene oxide, or first ethylene oxide and then an alkylene oxide of 3 or 4 carbon atoms, with a polyfunctional alcohol of 2 to 10 carbon atoms and 2 to 6 hydroxyl groups is carried out. In the second reaction stage, the resulting reaction product is subjected to an addition reaction with one or more alkylene oxides of 8 to 30 carbon atoms or one or more alkyl or alkenyl glycidyl ethers where the alkyl or alkenyl radical is of 8 to 30 carbon atoms. If mixtures of alkylene oxides of 2 to 4 carbon atoms are used in the first reaction stage, it is possible to prepare either random copolymers (i.e. the reaction is carried out with mixtures of alkylene oxides) or block copolymers. The block copolymers are example first with ethylene oxide and then with propylene oxide or butylene oxide. The alkylene oxides are subjected to an addition reaction with the dihydric to hexahydric alcohols in a conventional manner. These polyfunctional alcohols may be alkanepolyols, alkenepolyols, alkynepolyols or oxyalkylenepolyols. Examples of alkanepolyols are ethylene glycol, 1,2-propylene glycol, 1,3-propylene glycol, 1,2-butanediol, 1,3-butanediol, 1,4-butanediol, trimethylolpropane, pentaerythritol, glycerol, 2,3,4,5-hexanetetrol, glucose and other sugars having a similar structure. Examples of alkenepolyols are 2-butene-1,4-diol-1,2-hexene-1,4,6-triol, 1,5-hexadiene-3,4-diol and 3-heptene-1,2,6,7-tetrol. Examples of alkynepolyols are 2-butyne-1,4-diol, 2-hexyne-1,4,6-triol and 4-octyne-1,2,7,8-tetrol. In the present context, oxyalkylene glycols are diethylene glycol, triethylene glycol, tetraethylene glycol, dipropylene glycol and similar compounds. Among the stated polyfunctional alcohols, trimethylolpropane, pentaerythritol, ethylene glycol and diethylene glycol are preferred for the preparation of the polyetherpolyols according to (b). 1 mole of the polyhydric alcohol is subjected to an addition reaction with an alkylene oxide of 2 to 4 carbon atoms in an amount not less than that required to give products which have up to 90% by weight of oxyalkylene units of alkylene oxides of 2 to 4 carbon atoms. However, the alkylene oxide adduct prepared in the first stage of the reaction may also consist completely of oxyethylene units. In addition to the pure ethylene oxide adducts with the suitable polyhydric alcohols, those adducts of the polyhydric alcohols with ethylene oxide and propylene oxide which contain ethylene oxide and propylene oxide in a weight ratio of from 70:30 to 95:5 are of interest. They may be either random polymers or block copolymers.

In the second stage of the preparation of the polyetherpolyols (b), the polyhydric alcohols prepared in the first process stage and reacted with $C_2/C_4$-alkylene oxides are reacted with 1,2-alkylene oxides of 8 to 30 carbon atoms. Instead of the 1,2-alkylene oxides, it is also possible to use 1,2-alkyl or 1,2-alkenyl glycidyl ethers. The preparation of such glycidyl ethers is disclosed in, for example, U.S. Pat. No. 4,086,279. Examples of suitable long-chain alkylene oxides are 1,2-epoxyoctane, 1,2-epoxydodecane, 1,2-epoxyhexadecane, 1,2-epoxyoctacosane and mixtures of the stated epoxides as well as the commercial mixtures of epoxides of 10 to 20 carbon atoms. Examples of alkyl glycidyl ethers are dodecyl, tetradecyl, hexadecyl, octadecyl, eicosyl, 2-methyldodecyl, 2-methyltetradecyl, 2-methylpentadecyl, 2-hexyldecyl and 2-octyldodecyl glycidyl ether. A preferred alkenyl glycidyl ether is oleyl glycidyl ether.

It is known that the oxyalkylation reactions in the first and second reaction stages for the preparation of the polyetherpolyols are preferably carried out in the presence of a base, such as sodium hydroxide solution or potassium hydroxide solution, at elevated temperatures, for example up to 160° C. The reaction products obtained in the second stage contain the long-chain 1,2-alkylene oxide or the long-chain glycidyl ether in an amount of from 0.5 to 75, preferably from 1 to 20, % by weight, in the form of an adduct. Particularly preferred amounts of 1,2-alkylene oxides of 8 to 30 carbon atoms or of the corresponding glycidyl ethers in the polyetherpolyol are those which give a mean molar ratio of relatively long-chain epoxide or glycidyl ether to each individual hydroxyl group of the polyhydric alcohol of from 0.5 to 5, preferably from 0.5 to 1.5. The molecular weight of the polyetherpolyols of component (b) of the cleaner formulations is from 1,000 to 75,000, preferably from 5,000 to 25,000. The 1,2-alkylene oxides of 8 to 30 carbon atoms, or the glycidyl ethers used in their place, are present in the polyetherpolyols in an amount of from 0.5 to 75, preferably from 1 to 20, % by weight. The polyetherpolyols described are used in amounts of from 0.1 to 15, preferably from 0.15 to 10, % by weight in aqueous acidic cleaner formulations. In combination with the nonionic surfactants stated under (a) in such formulations, they have a synergistic effect with regard to the viscosity increase. The viscosities of the aqueous acidic cleaner formulations are from 100 to 19,000 mPa.s.

Suitable components (c) of the cleaner formulations are inorganic or organic acids, e.g. hydrochloric acid, sulfuric acid, phosphoric acid, formic acid, oxalic acid and citric acid, or dicarboxylic acid mixtures (for example mixtures of succinic acid, glutaric acid and adipic acid). Acidic phosphoric esters and amidosulfonic acid and propanesulfonic acid are also suitable. The cleaner formulations contain from 1 to 40, preferably from 5 to 20, % by weight; of one or more acids.

In addition to the stated components (a) to (c), the acidic cleaner formulations contain water to 100% by weight. The cleaner formulations may furthermore contain other components, such as solubilizers, corrosion inhibitors or builders. Solubilizers are, for example, compounds such as isopropanol, glycol ether, cumenesulfonic acid or its alkali metal salts. The solubilizers are used in an amount of not more than 10% by weight, based on the total formulation. The cleaner formulations may also contain corrosion inhibitors, which may be used in amounts of not more than 1% by weight. Examples of suitable corrosion inhibitors are butyne-1,4-diol in amounts of from 0.1 to 0.2%, based on 10% effectively present acid, for $HCl/H_2SO_4$, or methylphenylthiourea in an amount of 0.5%, based on 20% effectively present acid, for $H_3PO_4$.

The cleaner formulations may furthermore contain builders. These are, for example, compounds such as acidic salts of phosphoric acid, sulfuric acid, etc. (sodium hydrogen phosphate or sodium hydrogen sulfate).

The amount of builders in the cleaner formulation is not more than 20% by weight.

The aqueous acidic cleaner formulations described above are used for cleaning hard surfaces. The removal of calcium carbonate and magnesium carbonate deposits from pipelines or heat exchangers operated using hard water is an example. The acidic cleaner formulations are also used in dairies, for example for removing deposits of lactic acid from articles made of metal, porcelain or ceramic.

In the Examples which follow, parts and percentages are by weight.

The viscosities were measured in a Couette rotational viscometer at 20° C. and at a shear rate of 150 $sec^{-1}$. The molecular weights of the substances are number average molecular weights.

The following polyetherpolyols were used as thickeners (component (b)):

Thickener A: Polyetherpolyol having a molecular weight of about 17,000 and obtainable by reacting 1 mole of trimethylolpropane with a mixture of 102 moles of ethylene oxide and 19 moles of propylene oxide and then further reacting the oxyalkylation product with 3 moles of a 1,2-alkylene oxide of 16 carbon atoms. The amount of long-chain alkylene oxide was 4.06% by weight.

Thickener B: Polyetherpolyol having a molecular weight of about 17,000 and obtainable by reacting 1 mole of trimethylolpropane with 85 parts of ethylene oxide and 15 parts of propylene oxide and then further reacting the product with 3 equivalents of a mixture of 1,2-alkylene oxides where the alkylene chain is of 15 to 18 carbon atoms. The amount of bonded, relatively long-chain alkylene oxide was 4.18% by weight.

Thickener C: Polyetherpolyol having a molecular weight of about 17,000 and obtained by reacting 1 mole of trimethylolpropane with 280 moles of ethylene oxide and then further reacting the product with 3 equivalents of a 1,2-alkylene oxide of 12 carbon atoms. The amount of relatively long-chain alkylene oxide was 3.17% by weight.

Thickener D: Polyetherpolyol having a molecular weight of about 17,000 and obtained by reacting 1 mole of trimethylolpropane with 380 moles of ethylene oxide and then further reacting the product with 3 equivalents of a 1,2-alkylene oxide of 18 carbon atoms. The content of incorporated $C_{18}$-alkylene oxide was 4.55% by weight.

The following surfactants were used in the cleaner formulations:

Surfactant I: Adduct of 7 moles of ethylene oxide with 1 mole of isodecanol.

Surfactant II: Adduct of 8 moles of ethylene oxide with 1 mole of isotridecanol.

Surfactant III: Adduct of 7 moles of ethylene oxide with 1 mole of a $C_{13}/C_{15}$-fatty alcohol mixture.

Surfactant IV: Adduct of 3 moles of ethylene oxide with 1 mole of a $C_{13}/C_{15}$-fatty alcohol mixture.

Surfactant V: Adduct of 5 moles of ethylene oxide with 1 mole of a $C_{13}/C_{15}$-fatty alcohol mixture.

Surfactant VI: Adduct of 11 moles of ethylene oxide with 1 mole of a $C_{13}/C_{15}$-fatty alcohol mixture.

Surfactant VII: Adduct of 11 moles of ethylene oxide with 1 mole of a $C_{16}/C_{18}$-fatty alcohol mixture.

Surfactant VIII: Adduct of 5 moles of ethylene oxide with 1 mole of isotridecanol.

Surfactant IX: Adduct of 10 moles of ethylene oxide with 1 mole of a $C_9$-alkylphenol.

Surfactant X: Adduct of 8 moles of ethylene oxide with 1 mole of a $C_{13}/C_{15}$-fatty alcohol.

By mixing the surfactant, thickener, acid and water, the following aqueous acidic cleaner formulations in the Examples were prepared:

10% of surfactant,
X% of thickener,
20% of acid and
70-X% of water.

A thickener-free formulation of the following composition was investigated in each case for comparison:

15% of surfactant,
20% of acid and
65% of water.

The composition of the aqueous acidic cleaner formulations prepared in each case and the viscosity of these formulations are stated in Table 1. The experiments were numbered serially; where these are Comparative Examples, this is indicated in the Table by adding (comparison).

TABLE 1

| Example No. | Surfactant | Conc. of the surfactant [%] | Thickener | Conc. of the thickener [%] | Acid | Viscosity in mPa.s |
|---|---|---|---|---|---|---|
| 1 (comp.) | I | 15 | — | — | $H_3PO_4$ | 9.9 |
| 2 | I | 10 | A | 5 | $H_3PO_4$ | 133.5 |
| 3 | I | 10 | B | 5 | $H_3PO_4$ | 115.0 |
| 4 | I | 10 | C | 5 | $H_3PO_4$ | 160 |
| 5 | I | 10 | D | 5 | $H_3PO_4$ | 133 |
| 6 (comp.) | II | 15 | — | — | $H_3PO_4$ | 13.9 |
| 7 | II | 10 | A | 5 | $H_3PO_4$ | 949 |
| 8 | II | 10 | B | 5 | $H_3PO_4$ | 1100 |
| 9 | II | 10 | C | 5 | $H_3PO_4$ | 401 |
| 10 | II | 10 | D | 5 | $H_3PO_4$ | 1168 |
| 11 (comp.) | III | 15 | — | — | $H_3PO_4$ | 179 |
| 12 | III | 10 | A | 5 | $H_3PO_4$ | Gel |
| 13 | III | 10 | B | 5 | $H_3PO_4$ | 13800 |
| 14 | III | 10 | C | 5 | $H_3PO_4$ | 8700 |
| 15 | III | 10 | D | 5 | $H_3PO_4$ | Gel |
| 16 (comp.) | IV | 15 | — | — | $H_3PO_4$ | 41 |
| 17 | IV | 10 | B | 5 | $H_3PO_4$ | 6200 |
| 18 (comp.) | V | 15 | — | — | $H_3PO_4$ | 193 |
| 19 | V | 10 | B | 5 | $H_3PO_4$ | 18675 |
| 20 (comp.) | VI | 15 | — | — | $H_3PO_4$ | 12 |
| 21 | VI | 10 | B | 5 | $H_3PO_4$ | 2620 |
| 22 (comp.) | VII | 15 | — | — | $H_3PO_4$ | 16 |
| 23 | VII | 10 | B | 5 | $H_3PO_4$ | 8800 |
| 24 (comp.) | VIII | 15 | — | — | $H_3PO_4$ | 121 |
| 25 | VIII | 10 | B | 5 | $H_3PO_4$ | 1450 |
| 26 (comp.) | I | 15 | — | — | $H_3PO_4$ | 9.9 |
| 27 | I | 10 | A | 5 | $H_3PO_4$ | 133.5 |
| 28 (comp.) | I | 15 | — | — | $H_2SO_4$ | 9 |
| 29 | I | 10 | A | 5 | $H_2SO_4$ | 125 |
| 30 (comp.) | I | 15 | — | — | HCOOH | 9 |
| 31 | I | 10 | A | 5 | HCOOH | 38 |
| 32 (comp.) | I | 15 | — | — | oxalic acid | 9 |
| 33 | I | 10 | A | 5 | oxalic acid | 54 |
| 34 (comp.) | I | 15 | — | — | citric acid | 9 |
| 35 | I | 10 | A | 5 | citric acid | 87 |
| 36 (comp.) | III | 15 | — | — | $H_3PO_4$ | 179 |
| 37 | III | 10 | A | 5 | $H_3PO_4$ | Gel |
| 38 (comp.) | III | 15 | — | — | $H_2SO_4$ | 165 |
| 39 | III | 10 | A | 5 | $H_2SO_4$ | 236 |
| 40 (comp.) | III | 15 | — | — | HCOOH | 47 |
| 41 | III | 10 | A | 5 | HCOOH | 1982 |
| 42 (comp.) | III | 15 | — | — | oxalic acid | 66 |
| 43 | III | 10 | A | 5 | oxalic acid | 1568 |
| 44 (comp.) | III | 15 | — | — | citric acid | 24 |
| 45 | III | 10 | A | 5 | citric acid | 6136 |

As shown by the Examples in Table 1, aqueous acidic cleaner formulations which have considerably higher viscosities than the corresponding thickener-free cleaner formulations are obtained according to the invention.

EXAMPLE 2

Aqueous acidic cleaner formulations were prepared according to the standard formulations stated in Example 1, the composition of these formulations being shown in each case in Table 2. The Table also gives information about the viscosity of the cleaner formulations.

TABLE 2

| No. | Surfactant (a) | Concentration of the surfactant [%] | Thickener (b) | Concentration of the thickener [%] | Acid 20% (c) | Viscosity of the cleaner formulation [mPa.s] |
|---|---|---|---|---|---|---|
| (comp.) | IX | 10 | — | — | $H_3PO_4$ | 18 |
| 2 (comp.) | IX | 10 | A | 1 | " | 40 |
| 3 (comp.) | III | 10 | — | — | " | 90 |
| 4 | III | 10 | A | 1 | " | 2598 |
| 5 (comp.) | X | 10 | — | — | " | 15 |
| 6 | X | 10 | A | 1 | " | 1082 |
| 7 | VII | 10 | — | — | " | 12 |
| 8 | VII | 10 | A | 1 | " | 865 |

The compositions stated in Table 2 under No. 4, 6 and 8 are Examples according to the invention while the remaining compositions serve for comparison. As shown in Table 2, the choice of the surfactant plays a decisive role with regard to the desired high viscosity of a cleaner formulation. An oxyethylated alkylphenol as the surfactant (comparison No. 2 in Table 2) does not give the desired increase in viscosity, whereas the surfactants III, X and VII lead to a surprisingly increased viscosity of the cleaner formulation.

We claim:

1. An aqueous acidic cleaner formulation comprising:
(a) 1-20 wt. % of one or more nonionic surfactants based on adducts of from 3-11 moles of ethylene oxide with one mole of a fatty alcohol, fatty acid, fatty amine, fatty amide or alkanesulfonamide,
(b) 0.1-15 wt. % of one or more polyether polyols which are obtained by reacting a dihydric to hexahydric alcohol of 2-10 carbon atoms with an alkylene oxide of 2-4 carbon atoms and reacting the product of this reaction with a $C_{8-30}$ 1 1,2-alkylene oxide, $C_{8-30}$ alkyl glycidyl ether or $C_{8-30}$ alkynyl glycidyl ether, and
(c) 1-40 wt. % of one or more acids, the percentages in each case being based on the weight of the total formulation.

2. The cleaner formulation of claim 1, comprising:
(a) a nonionic surfactant comprising an adduct of from 3-11 moles of ethylene oxide with one mole of one or more $C_{8-18}$ alcohols, and
(b) one or more polyether polyols obtained by reacting a dihydric to hexahydric $C_{2-6}$ alcohol with ethylene oxide, propylene oxide or mixtures thereof and hen reacting this product with a $C_{8-30}$ 1,2-alkylene oxide, said polyether polyol having a molecular weight of from 1,000 to 75,000 and containing from 0.5 to 75 wt. % of long-chain alkylene units.

3. The cleaner formulation of claim 1, wherein said fatty alcohol, fatty acid, fatty amine, fatty amide or alkane sulfonamide contains not less than 8 carbon atoms.

4. The cleaner formulation of claim 1, wherein said alcohol is a $C_{13}/C_{15}$-fatty alcohol mixture.

5. The cleaner formulation of claim 1, wherein said alcohol is isodecanol or isotridecanol.

6. The cleaner formulation of claim 1, wherein said alcohol is a $C_{16}/C_{18}$-fatty alcohol mixture.

7. The cleaner formulation of claim 1, wherein said alcohol is a $C_9$-alkyl phenol.

8. The cleaner formulation of claim 1, wherein said dihydric to hexahydric alcohol is trimethylolpropane.

9. The cleaner formulation of claim 1, wherein said surfactant is selected from the group consisting of adducts of (1) 7 moles of ethylene oxide with one mole of isodecanol, (2) 8 moles of ethylene oxide with one mole of a $C_{13}/C_{15}$-fatty alcohol mixture, (4) 3 moles of ethylene oxide with one mole of a $C_{13}/C_{15}$-fatty alcohol mixture, (5) 5 moles of ethylene oxide with one mole of a $C_{13}/C_{15}$-fatty alcohol mixture, (6) 11 moles of ethylene oxide with one mole of a $C_{13}/C_{15}$-fatty alcohol mixture, (7) 11 moles of ethylene oxide with one mole of a $C_{16}/C_{18}$-fatty alcohol mixture, (8) 5 moles of ethylene oxide with one mole of isotridecanol, (9) 10 moles of ethylene oxide with one mole of a $C_9$-alkylphenol and (10) 8 moles of ethylene oxide with one mole of a $C_{13}/C_{15}$-fatty alcohol.

10. The cleaner formulation of claim 8, wherein said trimethylolpropane is reacted with ethylene oxide, propylene oxide, or mixtures thereof to form a reaction product and the reaction product is further reacted with a $C_{12-18}$ 1,2-alkylene oxide.

11. The cleaner formulation of claim 10, wherein said trimethylolpropane is reacted with a mixture of ethylene oxide and propylene oxide in a weight ratio of from 70:30 to 95:5.

* * * * *